United States Patent [19]
Sargisson et al.

[11] 3,841,091
[45] Oct. 15, 1974

[54] MULTI-MISSION TANDEM PROPULSION SYSTEM

[75] Inventors: Donald Farley Sargisson, Cincinnati; Dan Joseph Rundell, Milford, both of Ohio

[73] Assignee: General Electric, Lynn, Mass.

[22] Filed: May 21, 1973

[21] Appl. No.: 362,485

[52] U.S. Cl................ 60/224, 60/230, 60/262, 60/263, 60/271
[51] Int. Cl................................................ F02k 3/12
[58] Field of Search ......... 60/224, 226 A, 242, 225, 60/39.33, 39.21, 271, 226 R, 262, 230, 263

[56] References Cited
UNITED STATES PATENTS

| | | | |
|---|---|---|---|
| 3,107,690 | 10/1963 | Pope et al. | 60/262 |
| 3,514,955 | 6/1970 | Paulson et al. | 60/262 |
| 3,659,422 | 5/1972 | Hope | 60/224 |
| 3,736,750 | 6/1973 | Britt | 60/226 A |

FOREIGN PATENTS OR APPLICATIONS

| | | | |
|---|---|---|---|
| 79,218 | 6/1950 | Czechoslovakia | 60/224 |
| 1,083,658 | 7/1967 | Great Britain | 60/271 |
| 1,084,980 | 7/1960 | Germany | 60/224 |

*Primary Examiner*—C. J. Husar
*Assistant Examiner*—O. T. Sessions

[57] ABSTRACT

A multi-mission tandem propulsion system is provided for an aircraft which must operate efficiently at both supersonic and subsonic speeds while generating low noise levels during takeoff, accelerated climb to altitude, approach to landing, and landing. The propulsion system includes a forward turbofan engine coaxially spaced apart from an aft turbojet engine wherein both engines may be selectively controlled to provide overall maximum efficiency during all modes of operation.

12 Claims, 8 Drawing Figures

MULTI-MISSION TANDEM PROPULSION SYSTEM

BACKGROUND OF THE INVENTION

This invention relates generally to a multi-mission tandem propulsion system and, more particularly, to a multi-mission tandem propulsion system employing variable cycle, dual tandem engines for an aircraft designed to operate efficiently at both subsonic and supersonic speeds.

Aircraft designed to meet multiple mission requirements such as operation at subsonic and supersonic speeds should ideally employ controlled variable cycle engines to provide the best performance for each mission mode. Many variable cycle propulsion systems have been attempted during recent years for application to mixed mission aircraft which must operate efficiently over a broad range of both subsonic and supersonic conditions. Many of these prior art systems achieved the variability in the cycle by varying the components of a given engine such as a turbojet or a turbofan. Varying the components of a given engine such as a turbojet or turbofan, however, have proved inefficient for multi-mission requirements becuase a turbofan engine cycle inherently provides better performance for aircraft operating at high subsonic speeds while a turbojet engine cycle inherently gives better performance at supersonic speeds.

Various methods for augmenting turbofan engine performance have also been used in order to attain more efficient aircraft operation for multi-missions. Augmentation, such as the burning of additional fuel behind the fan of a turbofan, or the mixing of fan air and gas generator air and burning additional fuel in the mixture, have all been used or proposed to achieve more efficient propulsion system matching and performance. These approaches, while being somewhat successful, have failed to provide the required economic efficiency for multi-mission requirements because the augmented performance of an afterburning turbofan engine has yet to meet the performance of an augmented turbojet due to the reduced pressure of the bypass air which reduces afterburning cycle efficiency.

Other suggestions for improving the efficiency of the multi-mission propoulsion system have included variable compressor stators, variable turbine stators, variable bypass valves, and similar schemes to produce a variable flow characteristic in the basic engine cycle. Some improvement in flexibility in system operation has been noted from these various approaches but optimum aircraft propulsion system matching has yet to be attained by these prior art methods.

Multi-mission propulsion systems must not only operate efficiently under a broad range of conditions, but must also exhibit a minimum disturbing effect upon the environment. One such environmental problem relates to the noise generated by aircraft engines and its distrubing effects upon the people residing in the vicinity of airports. This problem has become so acute of late that the Federal Aviation Agency has established noise level standards which must be met by aircraft and gas turbine engine manufacturers before a multi-mission propulsion system can be certified.

Again, turbojet engines which operate most efficiently at high supersonic speeds generate intolerable noise levels while taking off and landing at high powr settings and are therefore unsuitable for commercial application in multi-mission propulsion systems. Turbofan engines with high fan bypass ratios have significantly lower noise levels but are not suitable for supersonic flight and therefore have been limited primarily to subsonic commercial aircraft.

Therefore, it is a primary object of this invention to combine the best features of a turbofan engine with those of a turbojet engine to provide a tandem aircraft propulsion system suitable for efficient multi-mission operation at both subsonic and supersonic speeds.

It is also an object of this invention to provide a multi-mission tandem aircraft propulsion system which operates efficiently at supersonic speed, yet still meets the noise level certification criteria established by the Federal Aviation Agency for takeoff, climb out, approach to landing, and landing.

SUMMARY OF THE INVENTION

The above and other related objects of the invention may be accomplished by an aircraft variable cycle tandem propulsion system comprising a forward turbofan engine having a fan, gas generator, and power turbine arranged in axially spaced serial flow relation. An independent turbojet engine is coaxially displaced downstream of the turbofan engine and includes a compressor, combustor and turbine also arranged in axially spaced serial flow relation. An outer exhaust duct means is provided for directing the exhaust stream from the turbofan engine rearward around the turbojet engine. There is also included a variable cross-over valve means which may be operated in two modes, e.g., subsonic and supersonic. In the subsonic mode, air flow exiting from the fan which bypasses around the gas generator is directed to the outer exhaust duct means while at the same time a separate inlet ambient airflow stream is directed to the inlet of the turbojet. In the supersonic mode, air flow exiting from the fan which bypasses around the gas generator is directed to the turbojet inlet thereby supercharging the inlet airflow to the turbojet.

BRIEF DESCRIPTION OF THE DRAWINGS

The invention may be better understood upon reading the following description of the preferred embodiment in conjunction with the accompanying drawings.

DESCRIPTION OF THE PREFERRED EMBODIMENT

Figure 1:
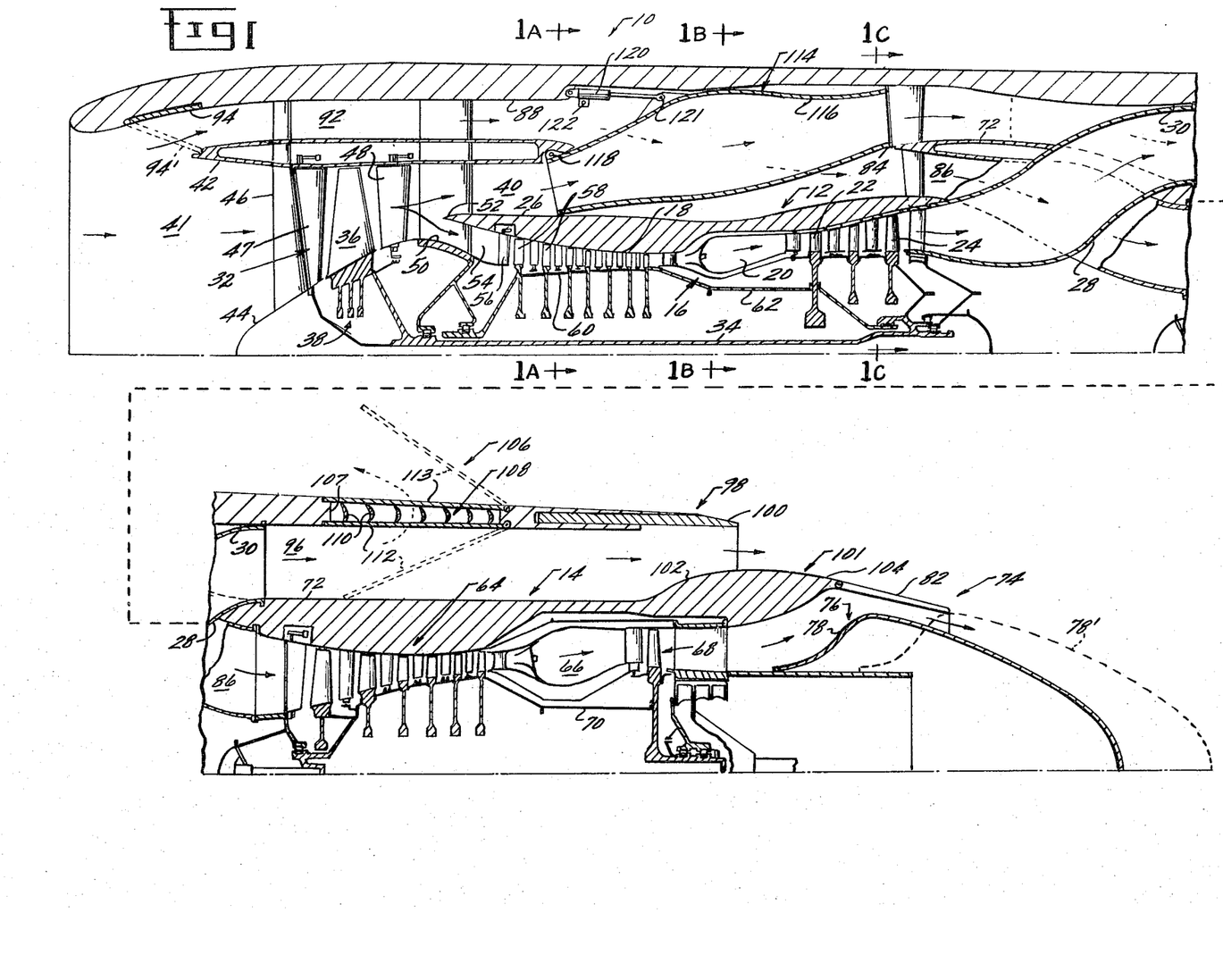
FIG. 1 is a cross-sectional view of the multi-mission tandem propulsion system of this invention.
Figure 2:
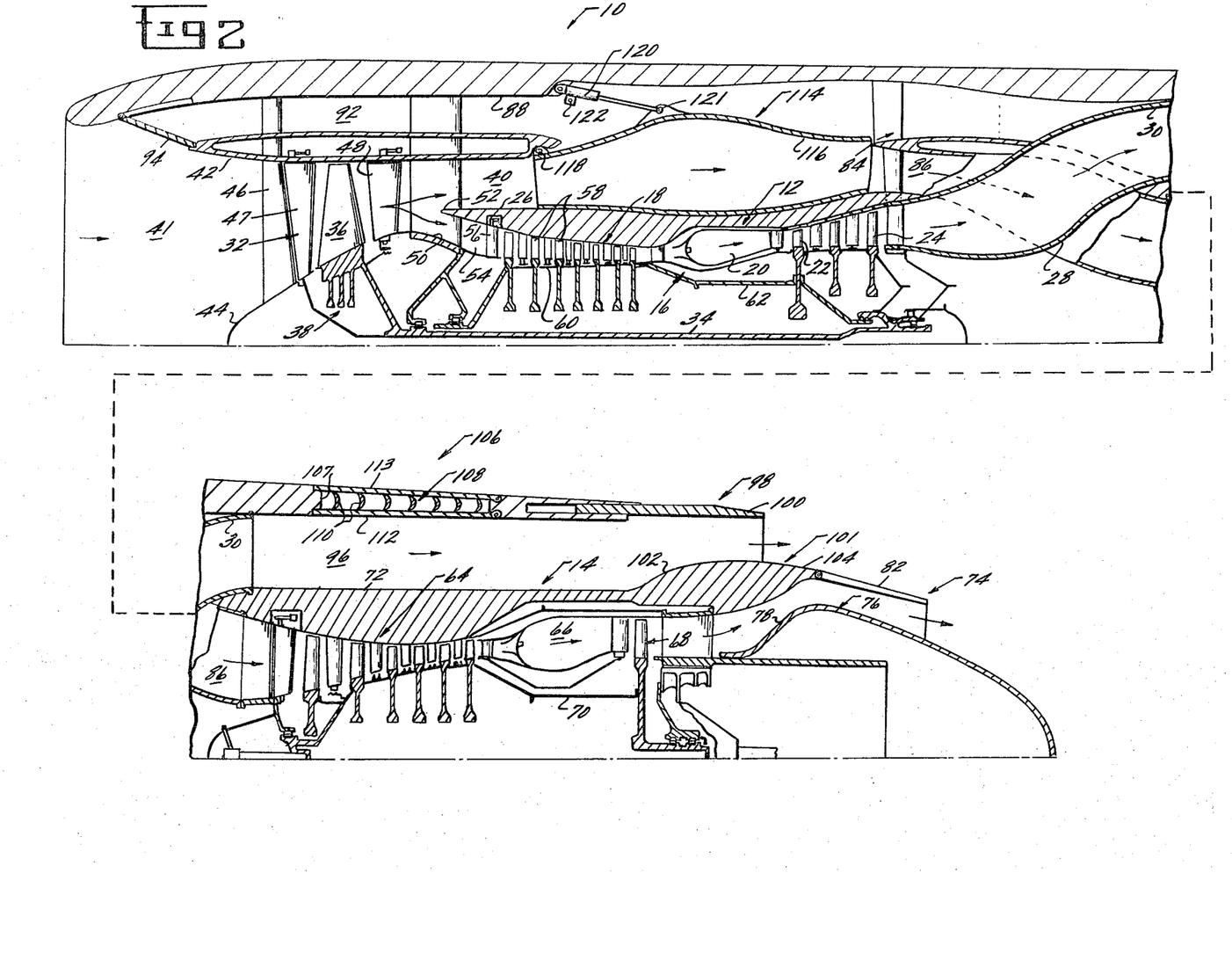
FIG. 2 is a cross-sectional view of the variable cycle propulsion system of FIG. 1 in a different mode of operation.

Referring now to the drawings wherein like numerals correspond to like elements throughout, FIGS. 1 and 2 show a tandem aircraft propulsion system 10 having a forward turbofan engine 12 of the high-bypass, high-pressure ratio type together with an independent turbojet engine 14 coaxially displaced rearward of the turbofan engine.

The turbofan engine 12 has a core, or gas generator, 16 which includes a compressor 18, a combustor 20, a gas generator high pressure turbine 22 for driving the compressor, and lower pressure stage turbines 24 arranged in axially spaced serial flow relationship. The inner turbomachine, or gas generator section 16, is enclosed within a cylindrical casing 26, the aft end of which defines a plurality of circumferentially spaced apart, outwardly flared, exhaust ducts 28 which terminate in a mixer chute 30. The mixer chute 30 may be of any well known type such as a daisy mixer.

A fan 32 is mounted upstream of the gas generator 16 and is driven by the low pressure turbines 24 through an interconnecting shaft 34. The fan 32 is comprised of a plurality of circumferentially spaced apart fan blades 36 which extend radially outward from a fan wheel 38. Located upstream of the fan blades 36 are a plurality of circumferentially spaced apart fan inlet guide vanes 46 with variable angle trailing edge sections 47 wherein the guide vanes 46 extend radially across an inner inlet passageway 41 defined between an intermediate cylindrical fan shroud, or casing, 42 and a bullet nose 44 located upstream of the fan blades 36. Downstream of the fan blades there are provided a plurality of circumferentially spaced apart variable angle fan outlet guide vanes 48 which extend radially outward from an inner fairing 50 of the gas generator 16 to the intermediate cylindrical casing 42.

The forward edge of the casing 26 defines a splitter platform at 52 which in cooperation with the inner engine fairing 50 defines a compressor inlet passageway 54. A median bypass duct or passageway 40 is also defined between the intermediate casing 42 and the splitter platform 52. The splitter platform 52 operates to divide the airflow exiting from the fan 32 such that a portion thereof enters the compressor 18 through the compressor inlet passageway 54. Located within this passageway 54 are a plurality of variable angle inlet guide vanes 56 for the gas generator 16 which are followed by a plurality of rotatable compressor blades 58 which extend from a compressor disc 60 and are coupled for rotation with the gas generator turbine 22 through an interconnecting shaft 62.

The turbojet engine 14 includes a compressor 64, a combustor 66, and a turbine 68 for driving the compressor 64, all of which are arranged in axially spaced serial flow relationship. The turbine 68 is coupled to drive the compressor 64 through an interconnecting shaft 70. The turbojet engine 14 is enclosed within a cylindrical casing 72 which terminates at its downstream end in a variable area exhaust nozzle 74 through which the combustion products of the turbojet engine may be discharged to produce thrust.

The variable area exhaust nozzle 74 includes a variable configuration plug 76 which is shown by the solid line at 78 in its retracted position with the phantom line at 78' showing the extended position. Appropriate means for varying the cross-sectional area around the plug 76 are provided by a plurality of circumferentially spaced apart primary flaps 82 which pivotally connect in overlapping fashion to the downstream edge of the cylindrical casing 72.

The forward edge of casing 72 provides a second splitter platform at 84 which in cooperation with the cylindrical casing 26 defines an inlet passageway 86 to the turbojet engine 14. The inlet passageway 86 interleaves between the spaced apart exhaust ducts 28 so as to cross the ducts without hindering the passage of airflow or producing objectionable disturbances in the inlet airflow to the turbojet engine.

The aircraft propulsion system 10 includes an outer casing 88 which is spaced apart from the forward turbofan engine 12 and the aft turbojet engine 14 so as to respectively define a forward annular outer bypass duct 92 and an aft annular outer exhaust duct 96. A plurality of circumferentially spaced apart overlapping inlet doors 94 are shown pivotally mounted to the upstream end of the outer casing 88 so as to regulate the inlet airflow to the outer bypass duct 92. Other suitable means for controlling the inlet airflow to the bypass duct 92 could also be employed. The outer annular exhaust duct 96 terminates in a variable area convergent–convergent/divergent exhaust nozzle 98 comprising a translatable overlapping shroud 100 which is slidably disposed in relation to the downstream end of the outer casing 88. There is also provided a convergent – convergent/divergent hollow center body 101 which includes a converging portion 102 together with a diverging portion 104 as is well known in the art.

A thrust reverser shown generally at 106 is also provided for the aircraft propulsion system 10. The thrust reverser 106 includes an annular opening 107 through the outer casing 88 within which is disposed a cascade 108 comprising a plurality of axially spaced arcuate fins 110 for reversing the direction of fluid flow therethrough. Downstream of the opening 107 there are provided a plurality of circumferentially spaced apart blocker flaps 112 pivotally connected to the outer casing 88 so that the flaps can be swung into engagement with the casing 72 so as to divert the fluid flow from the exhaust duct 96 through the reversing fins 110 of the reverser cascade 108. A plurality of circumferentially spaced apart outside blocker doors 113 may also be pivotally connected to the outer casing 88 so as to simultaneously swing outwardly when the blocker flaps 112 are swung inwardly.

Intermediate the casings 42 and 72, there is provided a variable cross-over valve 114 comprising a plurality of axially extending and circumferentially spaced apart ducts 116 each one of which is hinged at 118 to the downstream edge of casing 42. The variable cross-over valve 114 is fully described in a patent application filed concurrently with the instant application. A plurality of circumferentially spaced apart actuators 120 are provided wherein one end of each actuator is in pivotal connection to the casing 88 with the opposing end of each actuator rotatably connected to an adjacent duct 116 at clevis 121. The actuators 120 may all be synchronously operated by a flexible drive shaft 122 extending circumferentially around the outer casing 88 in interconnection with all the actuators and of the type fully described in U.S. Pat. No. 3,515,033 assigned to the instant assignee.

Figure 1A:
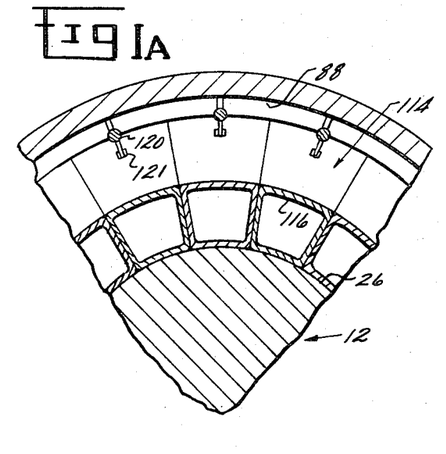
FIG. 1A is a cross-sectional view taken along the line A—A of FIG. 1.
Figure 1B:
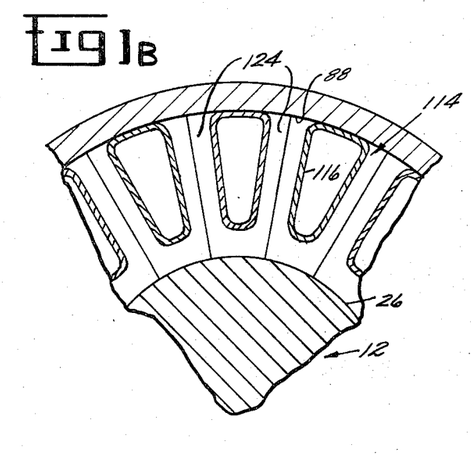
FIG. 1B is a cross-sectional view taken along the line B—B of FIG. 1.
Figure 1C:
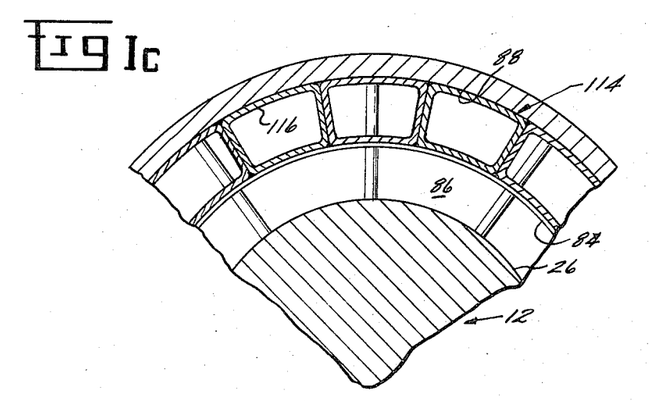
FIG. 1C is a cross-sectional view taken along the line C—C of FIG. 1.

Referring now specifically to FIGS. 1A, 1B, and 1C, it can be seen that the cross-sectional shape of the hinged ducts 116 may vary considerably along their axial length, although it is preferred that the ducts maintain a near constant cross-sectional area. The ducts 116 may assume a near airfoil cross-sectional configuration throughout most of their axial length in order not to unduly disturb the airflow passing in the spaces 124 therebetween.

As previously discussed, aircraft propulsion systems designed to meet multiple mission requirements of subsonic and supersonic flight should ideally employ a controlled variable engine cycle to provide the best performance during each mission mode. A turbofan engine provides the best performance for aircraft operating at subsonic speeds, while a turbojet engine of appropriate pressure ratio provides better performance at supersonic speeds. The subsonic performance of a turbojet engine is inherently inferior to that of a turbofan while the supersonic performance of a turbofan engine, even if augmented by afterburning, is inferior to that of a turbojet in view of the overall thrust and specific fuel consumption of the engines. The aircraft propulsion system 10 of this invention combines the best features of turbofan engines, e.g., good subsonic performance, with those of a turbojet engine, e.g., good supersonic and trans-sonic acceleration performance.

Referring again to FIG. 1, there is shown the mode of operation for the tandem aircraft propulsion system 10 which is generally assumed during takeoff, sustained acceleration to near supersonic flight, approach to landing, and landing. The inlet doors 94 are pivoted outwardly to permit an inlet airflow to the outer bypass duct 92. Actuators 120 are also simultaneously retracted to rotate the hinged ducts 116 of the variable cross-over valve 114 to the position providing direct flow communication between the inner bypass duct 40 and the outer exhaust duct 96. Direct flow communication from the outer bypass duct 92 is also established to the inlet passageway 86 through the spaces 124 intermediate the hinged ducts 116. The exhaust gases of the turbofan engine 12 cross over the inlet airflow to the turbojet engine 14 and commingle at the mixer chute 30 with the bypass airflow from the fan 32. The mixture of turbofan exhaust gases and bypassed fan airstream flows through the outer exhaust duct 96 and then exits through the variable area nozzle 98 which is retracted to assume the convergent position as shown. The turbojet engine 14 receives an inlet ambient airflow from the outer bypass duct 92 wherein the inlet airflow first crosses the bypassed airflow from the fan 32 and then crosses the exhaust stream from the gas generator 16 prior to entering the compressor 64. The exhaust stream from the turbojet engine 14 exits through the variable exhaust nozzle 74 wherein the variable configuration plug 76 is retracted to the position as shown by the solid line 78.

The aircraft propulsion system 10 is preferably fully integrated with the variable inlet doors and exhaust nozzles by a control system, not shown. Alternatively, a semi-automatic system utilizing the pilot control of the inlet doors 94, fan 32, gas generator 16, turbojet engine 14, and variable exhaust nozzles 74, 98 may be utilized in accordance with well known aircraft control practices. During this mode of operation, the turbojet 14 is controlled to operate at a relatively low temperature such that the velocity of the exhaust exiting from the nozzle 74 does not give rise to high noise levels. While the turbojet is controlled to operate at a relatively low temperature, the turbofan engine 12 is controlled to operate at maximum temperature and power thereby producing the greater portion of the total thrust of the tandem aircraft propulsion system 10. In this manner takeoff, acceleration to near supersonic speed, approach to landing and landing may all be accomplsihed by the aircraft propulsion system 10 with the acceptably low nose levels and the raltive efficiency commonly associated with good subsonic gas turbine engine operation.

Referring now to FIG. 2, there is shown the mode of operation for the aircraft propulsion system 10 which is generally assumed during transonic acceleration and supersonic flight. The inlet doors 94 are swung inwardly to block the inlet airflow to the outer bypass duct 92 while the actuators 120 are simultaneously extended to rotate the hinged ducts 116 of the variable cross-over valve 114 to provide direct flow communication between the inner bypass duct 40 and the inlet passageway 86. During this transonic and supersonic mode of operation the ducted exhaust gases from the turbofan engine 12 cross over the inlet airflow to the turbojet engine 14 and flow through the outer exhaust duct 96 exiting through the variable area exhaust nozzle 98 which may be extended to the convergent/divergent position shown, as is well understood for supersonic flight. At the same time the turbojet engine 14 receives the bypass air flow from the fan 32 which is now controlled to operate at a speed and flow output level consistent with that required to match the maximum inlet flow capability of the turbojet engine. As is readily apparent, the fan 32 increases the ram pressure of the inlet airflow to the compressor 64 of the turbojet engine 14 such that the overall power of the turbojet may be increased to equal or exceed the power of the turbofan engine 12. In this manner, the aircraft propulsion system 10 may be operated at maximum efficiency taking advantage of the inherently better performance which turbojet engines exhibit at supersonic speeds. Although the resulting increase in power of the turbojet engine 14 would give rise to substantially increased noise levels, it is generally assumed that supersonic flight would not be attained until the aircraft reached such altitude that the increased noise levels would be entirely acceptable if heard on the ground. In any event the increased noise levels would not be as high as those normally associated with an afterburning turbojet engine.

Referring back to FIG. 1, there can be seen a third mode of operation for the aircraft propulsion system 10 which is generally assumed for extended subsonic flight. During this mode of operation, the inlet doors 94 are swung inwardly to the closed position shown by the phantom line 94' while the actuators 120 are simultaneously retracted to rotate the hinged ducts 116 of the variable cross-over valve 114 to provide direct flow communication between the inner bypass duct 40 and the outer exhaust duct 96. As is readily apparent, the inlet airflow to the turbojet engine 14 is closed off and hence the turbojet engine is shut down and isolated from the airflow stream so as to present no additional drag. The variable exhaust nozzle 74 is also completely closed off by the variable plug 76 which is translated to the expanded position shown by the phantom line 78' thus improving the base area contour and also reducing drag. During this mode of operation, the turbofan engine 12 is operated at a power level consistent with the flight requirement for the aircraft propulsion system. The exhaust gases exiting from the turbofan engine 12 are bypassed around the turbojet engine 14 and exit through the variable exhuast nozzle 98 which assumes the convergent position shown for subsonic operation. In this manner, the specific fuel comsumption of the aircraft propulsion system 10 during extended subsonic cruise can be made comparable to the specific fuel consumption attainable from a conventional high-bypass turbofan engine over a braod range of aircraft operating speeds and altitudes without a substantial increase in external drag.

The turbofan engine 12 is intended to operate at all times during all modes of flight operation and is provided with a conventional concentric built in thrust reverser 106 which may be operated through rotation of the blocker doors 112 to close off the exit area through the variable nozzle 98 and divert the fluid flow through the cascade fins 112 in order to reverse direction. It will be readily appreciated that the turbojet engine 14 is not provided with a thrust reverser because it is contemplated that it will operate at or near idle power during all noise restricted flight phases of the approach and landing pattern. However, the turbojet engine would be available immediately for increase in the overall thrust levels of the propulsion system should the need arise.

The redundancy of the aircraft propulsion system of this invention provides an increased margin of safety, such that if the turbofan engine 12 had to be shut down during flight due to a malfunction, it would still be possible to operate the turbojet engine 14 independently so as not to unduly jeopardize the overall thrust of the entire aircraft propulsion system. Also, in the vent that the turbojet engine 14 had to be shut down during supersonic flight, the turbofan engine 12 would be capable of maintaining the inlet flow so as to avoid the high percentage of propulsion system drag that is normally associated with an engine shutdown during supersonic flight. In addition, the coaxial tandem arrangement of the turbofan and turbojet engines provides only a small extension in the overall cross-sectional area of the propulsion system, thereby minimizing any external increase in drag.

In some instances for aircraft currently employing four separate engines, each with its own separate nacelle, it may be possible to replace the entire four engines with two of the tandem propulsion systems of this invention thereby reducing the overall number of nacelles from four to two and thus lowering aircraft drag and weight.

It should be further appreciated that the aircraft propulsion system of this invention does not employ an afterburner system. The turbojet engine, in effect, takes the place of an afterburner and because the turbojet is a more efficient thrust producing device than an afterburner, there is a decrease in the toal fuel flow required to produce a given level of thrust. Whereas the turbojet employs a more efficient combustion process than an afterburner, the level of emissions may also be reduced to provide less pollution of the atmosphere at all operating conditions.

Figure 4:
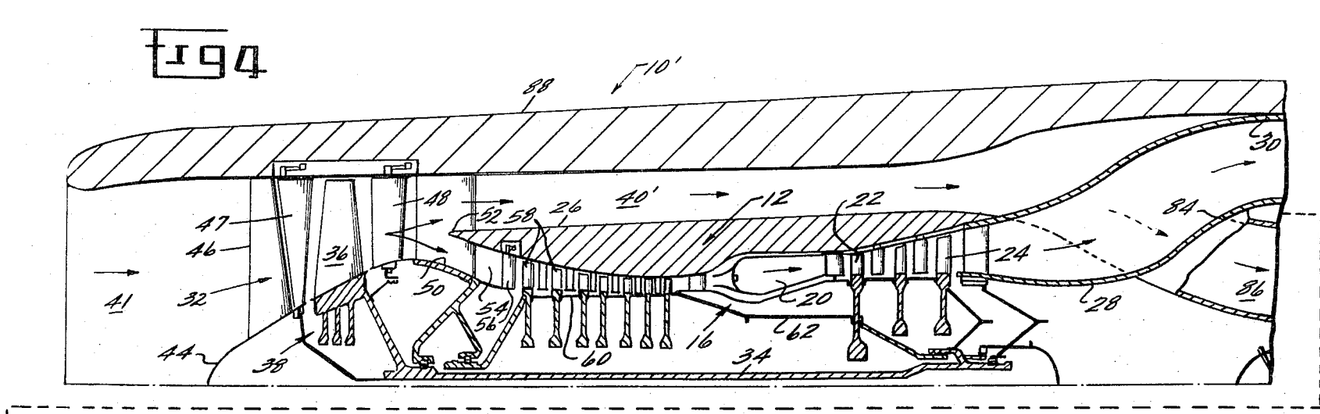
FIG. 4 is a cross-sectional view of another alternate embodiment of the propulsion system of FIG. 1.
Figure 5:
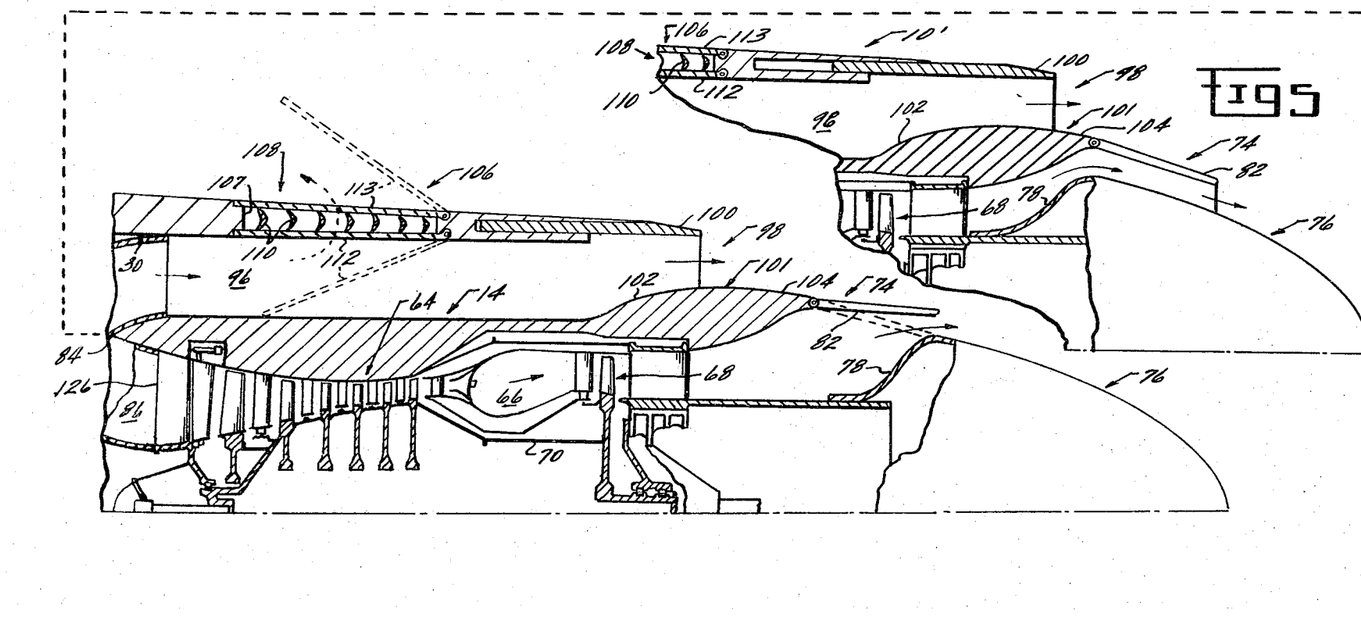
FIG. 5 is a cross-sectional view of the variable cycle propulsion system of FIG. 4 in a different mode of operation.

Referring now to FIGS. 4 and 5, there is shown at 10' a simplified version of the multi-mission tandem propulsion system of FIGS. 1 and 2 wherein the variable cross-over valve 114 and the outer bypass duct 92 have been elminated. The inlet airflow to the turbojet engine 14 is received directly from the fan 32 through a bypass duct 40' and may be controlled by a plurality of circumferentially spaced apart variable angle inlet guide vanes 126 in cooperation with the variable area exhaust nozzle 74. Referring now specifically to FIG. 4, there is shown the mode of operation for the tandem aircraft propulsion system 10' which is generally assumed during takeoff, sustained acceleration to near supersonic flight, approach to landing and landing. During this mode of operation the aircraft propulsion system is fully integrated with the exhaust nozzles 74, 98 and the variable angle inlet guide vanes 126 by a control system, not shown, such that the turbojet 14 is controlled to operate at a relatively low temperature. In this manner, the velocity of the exhaust exiting from the nozzle 74 does not give rise to high noise levels. While the turbojet 14 is controlled to operate at a relatively low temperature, the turbofan engine 12 is controlled to operate at maximum temperature and power, thereby producing the greater portion of the total thrust of the aircraft propulsion system 10'. Therefore, takeoff, acceleration to near supersonic speed, approach to landing and landing may all be accomplished by the aircraft propulsion system 10' with the acceptably low noise levels and the relative efficiency commonly associated with good subsonic gas turbine engine operation.

Referring now specifically to FIG. 5, there is shown the mode of operation for the aircraft propulsion system 10' which is generally assumed during transonic acceleration and supersonic flight. The exhaust nozzle 74, and the variable inlet guide vanes 126 are opened to increase the rate of flow through the turbojet such that the overall power of the turbojet may be increased to equal or exceed the power of the turbofan engine 12. In this manner, the aircraft propulsion system 10' may again be operated at maximum efficiency taking advantage of the inherently better performance characteristics which turbojet engines exhibit at supersonic speeds. Although the resulting increase in power of the turbojet engine 14 would give rise to substantially increased noise levels, it is again generally assumed that supersonic flight would not be attained until the aircraft reached such altitude that the increased noise levels would be entirely acceptable if heard on the ground.

Referring back to FIG. 4, there can be seen a third mode of operation for the aircraft propulsion system 10' which may be assumed for extended subsonic flight. During this mode of operation the variable inlet guide vanes 126 are operated to completely close off the inlet airflow to the turbojet and the variable flaps 82 are pivoted inwardly to the position shown by the phantom lines to completely close off the nozzle 74. The turbofan engine can now be operated at a power level consistent with the flight requirement for the aircraft propulsion system. The exhaust gases exiting from the turbofan engine 12 are bypassed around the turbojet engine 14 and exit through the variable exhaust nozzle 98 which resumes the convergent position shown for subsonic operation. In this manner, the specific fuel consumption of the aircraft propulsion system 10' during extended cruise can again be made comparable to the specific fuel consumption attainable from a conventional high bypass turbofan engine over a broad range of aircraft operating speeds and altitudes.

Figure 3:
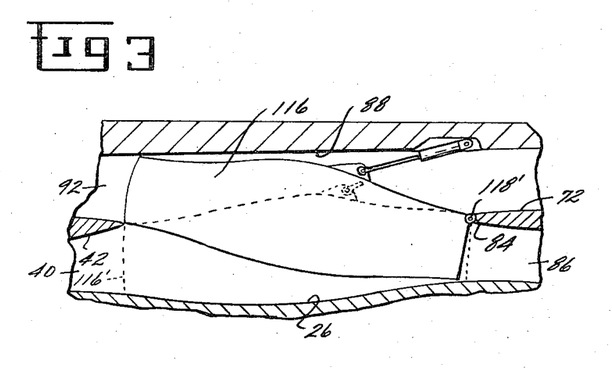
FIG. 3 is a cross-sectional view of a portion of an alternate embodiment of the propulsion system of FIG. 1.

Various changes could be made in the tandem aircraft propulsion systems herein described without departing from the broader aspects of the invention. For example, the turbofan engine 12 has been described in relation to a single stage fan 32; however, the fan could include more than one stage. Also, the spaced apart ducts 116 of the variable cross-over valve 114 of FIGS. 1 and 2 have been illustrated as hinged to the downstream edge of the intermediate casing 42 although they could alternatively be hinged to the forward edge of the casing 72 at the splitter platform 84 as shown in FIG. 3. The solid lines of FIG. 3 show the ducts 116 of the variable cross-over valve 114 as they would be positioned for the takeoff, acceleration to near supersonic flight, approach to landing, and landing mode of operation as previously discussed in relation to FIG. 1. For the transonic acceleration and supersonic flight mode of operation previously discussed in relation to FIG. 2, the ducts 116 would be rotated to assume the position shown by the phantom lines 116' in FIG. 3.

Thus having described the various preferred embodiments of the invention, though not exhaustive of all possible equivalents, what is desired to be secured by Letters Patent is claimed below.

What is claimed is:

1. A tandem variable cycle propulsion system comprising:
   a forward turbofan engine having a fan, gas generator, and fan turbine arranged in axially spaced serial flow relation;
   a coaxially displaced downstream turbojet engine having a compressor, combustor and turbine arranged in axially spaced serial flow relation;
   outer exhaust duct means for directing the exhaust stream from the turbofan engine rearward around the turbojet engine; and
   variable cross-over valve means which may assume a first subsonic mode whereby the flow exiting from the fan and bypassed around the gas generator is directed to the outer exhaust duct means while an inlet ambient airflow is directed to the inlet of the turbojet and a seocnd transonic and supersonic mode whereby the flow exiting from the fan and bypassed around the gas generator is directed to the turbojet inlet.

2. The propulsion system of claim 1 wherein:
   the gas generator includes an outer casing;
   the fan includes an outer casing spaced apart from the gas generator casing so as to define an inner bypass duct therebetween;
   the turbojet engine includes an outer casing open at one end to form an inlet;
   the propulsion system includes an outer casing spaced apart from both the fan casing and turbojet casing so as to respectively define a forward annular outer bypass duct and the outer exhaust duct means, and
   variable blocker door means provided within the forward annular outer bypass duct to regulate the inlet flow of ambient air therethrough.

3. The propulsion system of claim 2 wherein the cross-over valve is disposed between the fan casing and turbojet casing such that the first mode provides direct flow connection between the inner bypass duct and outer exhaust duct means together with direct flow connection between the outer bypass duct and the inlet to the turbojet with the second mode providing direct flow connection between the inner bypass duct and the inlet to the turbojet, and wherein the exhaust gases exiting from the gas generator are ducted across the inlet airflow to the turbojet into the outer exhaust duct means.

4. The propulsion system of claim 3, including:
   a mixer chute disposed within the outer exhaust duct means to accommodate the commingling of bypass fan air exiting through the inner bypass duct and exhaust gases exiting from the gas generator;
   a first variable exhaust nozzle disposed at the downstream end of the turbojet engine;
   a second variable convergent–convergent/divergent exhaust nozzle disposed at the downstream end of the outer exhaust duct means, and a thrust reversing means disposed within the outer exhaust duct means upstream of the second nozzle.

5. The propulsion system of claim 2 wherein:
   the cross-over valve includes a plurality of axially extending and circumferentially spaced apart ducts each of which is rotatably hinged to the downstream end of the fan casing such that all the ducts may be simultaneously rotated to provide either direct flow communication between the inner bypass duct and outer exhaust duct means whereupon direct flow communication is also established between the outer bypass duct and the inlet to the turbojet through the spaces intermediate the ducts or direct flow communication between the inner bypass duct and the inlet to the turbojet, and
   the exhaust gases exiting from the gas generator are directed through a plurality of circumferentially spaced apart, outwardly flared, exhaust ducts which cross over the inlet airflow to the turbojet and empty into the outer exhaust duct means through a mixer chute.

6. The propulsion system of claim 5 including:
   a first variable exhaust nozzle disposed at the downstream end of the turbojet engine and having an axially translatable plug which may be translated to entirely close off the first nozzle, a second variable convergent–convergent/divergent exhaust nozzle disposed at the downstream end of the outer exhaust duct means, and a thrust reverser having an opening through the propulsion system outer casing with a cascade of arcuate fins disposed therein for reversing the direction of fluid flow therethrough together with a plurality of blocker flaps which may be swung into the outer exhaust duct means to direct the flow of fluid through the cascade.

7. The propulsion system of claim 2 wherein:
   the cross-over valve includes a plurality of axially extending and circumferentially spaced apart ducts each of which is rotatably hinged to the upstream end of the turbojet casing such that all the ducts may be simultaneously rotated to provide either direct flow communication between the outer bypass duct and the inlet to the turbojet whereupon direct flow communication is also established between the inner bypass duct and outer exhaust duct means through the spaces intermediate the ducts, or direct flow communication between the inner bypass duct and the inlet to the turbojet, and
   the exhaust gases exiting from the gas generator are directed through a plurality of circumferentially spaced apart, outwardly flared, exhaust ducts which cross over the inlet airflow to the turbojet and empty into the outer exhaust duct means through a mixer chute.

8. The propulsion system of claim 7 including:
a first variable exhaust nozzle disposed at the downstream end of the turbojet engine and having an axially translatable plug which may be translated to entirely close off the first nozzle;
a second variable convergent–convergent/divergent exhaust nozzle disposed at the downstream end of the outer exhaust duct means, and
a thrust reverser having an opening through the propulsion system outer casing with a cascade of arcuate fins disposed therein for reversing the direction of fluid flow therethrough together with a plurality of blocker doors which may be swung into the outer exhaust duct means to direct the flow of fluid through the cascade.

9. A tandem variable cycle propulsion system comprising:
a forward turbofan engine ahving a fan operable within a bypass duct, a gas generator, and a fan turbine arranged in axially spaced serial flow relation;
a coaxially displaced downstream independent turbojet engine having variable inlet guide vanes, a compressor, a combustor, and a turbine arranged in axially spaced serial flow relation;
outer exhaust duct means in flow communication with the bypass duct for directing the exhaust stream from the turbofan engine rearward around the turbojet engine whereupon the exhaust stream is commingled with a portion of the airflow exiting from the fan;
and inlet passageway means whereby the remaining portion of the airflow exiting from the fan crosses the exhaust duct means and enters the inlet of the turbojet such that the proportions of total thrust of the propulsion system attiributable to the turbojet and turbofan may be varied to provide either low noise levels and relative efficiency commonly associated with subsonic gas turbine operation or a high rate of airflow commonly associated with supersonic gas turbine operation.

10. The propulsion system of claim 9 wherein:
the gas generator includes an outer casing;
the turbojet engine includes an outer casing open at one end to form an inlet; and
the propulsion system includes an outer casing spaced apart from both the gas generator and the turbojet casing so as to respectively define a bypass duct therebetween and the outer exhaust duct means which is in serial flow communication with the bypass duct.

11. The propulsion system of claim 10, including:
a mixer chute disposed within the outer exhaust duct means to accommodate the commingling of bypass fan air exiting through the bypass duct and exhaust gases exiting from the gas generator;
a first variable exhaust nozzle disposed at the downstream end of the turbojet engine;
a second variable convergent–convergent/divergent exhaust nozzle disposed at the downstream end of the outer exhaust duct means, and
a thrust reversing means disposed within the outer exhaust duct means upstream of the second nozzle.

12. The propulsion system of claim 10, including:
a mixer chute disposed within the outer exhaust duct means to accommodate the commingling of bypass fan air exiting through the bypass duct and exhaust gases exiting from the gas generator;
a first variable exhaust nozzle disposed at the downstream end of the turbojet engine and having an axially translatable plug which may be translated to entirely close off the first nozzle;
a second variable convergent–convergent/divergent exhaust nozzle disposed at the downstream end of the outer exhaust duct means, and
a thrust reverser having an opening through the propulsion system outer casing with a cascade of arcuate fins disposed therein for reversing the direction of fluid flow therethrough together with a plurality of blocker doors which may be swung into the outer exhaust duct means to direct the flow of fluid through the cascade.

* * * * *